United States Patent
Buzzard et al.

(10) Patent No.: US 9,764,757 B2
(45) Date of Patent: Sep. 19, 2017

(54) STEERING COLUMN ENERGY ABSORBING RAKE LOCK

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Melvin L. Tinnin, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/751,420

(22) Filed: Jun. 26, 2015

(65) Prior Publication Data

US 2015/0375770 A1 Dec. 31, 2015

Related U.S. Application Data

(60) Provisional application No. 62/018,264, filed on Jun. 27, 2014.

(51) Int. Cl.
   *B62D 1/184* (2006.01)
(52) U.S. Cl.
   CPC .................... *B62D 1/184* (2013.01)
(58) Field of Classification Search
   CPC ......... B62D 1/184; B62D 1/187; B62D 1/189
   See application file for complete search history.

(56) References Cited

U.S. PATENT DOCUMENTS

| | | | | |
|---|---|---|---|---|
| 8,657,338 B2* | 2/2014 | Buzzard | ............... | B62D 1/184 280/775 |
| 9,393,986 B1* | 7/2016 | Anspaugh | ............. | B62D 1/184 |
| 2009/0188342 A1* | 7/2009 | Cymbal | ............... | B62D 1/184 74/493 |
| 2009/0229399 A1* | 9/2009 | Ozsoylu | ............... | B62D 1/184 74/493 |
| 2014/0260763 A1* | 9/2014 | Buzzard | ............... | B62D 1/184 74/493 |
| 2014/0284909 A1* | 9/2014 | Nakazato | ............... | B62D 1/187 280/775 |
| 2015/0027263 A1* | 1/2015 | Kern | ..................... | B62D 1/187 74/495 |
| 2015/0090068 A1* | 4/2015 | Anspaugh | ............. | B62D 1/184 74/493 |
| 2015/0096404 A1* | 4/2015 | Martinez | ............... | B62D 1/195 74/492 |
| 2016/0144884 A1* | 5/2016 | Butler | .................. | B62D 1/187 74/495 |

* cited by examiner

*Primary Examiner* — Ruth Ilan
(74) *Attorney, Agent, or Firm* — Cantor Colburn LLP (57) ABSTRACT

A position lock for a steering column assembly is provided. The position lock includes an outer cam. Also included is an inner cam defining a slotted aperture to receive a rake bolt operatively coupled to the outer cam, the slotted aperture facilitating shuttling movement of the rake bolt therein. Further included is a tooth lock operatively coupled to the inner cam, the tooth lock rotatable between an unlocked position and a locked position. Yet further included is a pin extending through the inner cam and operatively coupled to the outer cam, and rotation of the outer cam facilitates movement of the tooth lock out of engagement with the rake lock tooth wall when rotating between the locked position and the unlocked position.

15 Claims, 9 Drawing Sheets

STEERING COLUMN ENERGY ABSORBING RAKE LOCK

CROSS-REFERENCE TO RELATED APPLICATION

This patent application claims priority to U.S. Provisional Patent Application Ser. Nos. 62/018,264, filed Jun. 27, 2014, which is incorporated herein by reference in its entirety.

FIELD OF THE INVENTION

The following description relates to steering columns for motor vehicles and, more specifically, to a rake lock mechanism for a steering column.

BACKGROUND

Some known steering columns for motor vehicles are provided with mechanisms for adjusting the steering column position by an operator of the motor vehicle. Available adjustments typically include a telescoping adjustment in which the steering column is extended toward the operator or retracted away from the operator, and a tilt or rake adjustment in which an angular position of the steering column is changed relative to the operator.

In some known systems, rake is adjusted by releasing an adjustment lever from a secured position, which then allows for rotation of the steering column about a pivot, typically located at an end of the steering column opposite that of the of the steering wheel. Returning the adjustment lever to the secured position retains the steering column in a desired set position about the pivot.

However, some traditional locks for steering columns may provide inadequate load handling capabilities for preventing upward steering column displacements in the event of a vehicle collision. Some prior attempts to address this issue have sought use of interlocking teeth to provide the required vertical stability. Unfortunately, however, many configurations that employ interlocking teeth to provide for a positive lock, while providing for selective engagement and disengagement of the teeth for alternating adjustment and locking of the steering column, encounter practical difficulties. For example, one source of dissatisfaction with such locking mechanisms is that the need to interlock the teeth of one component with the teeth of another may limit the available lock positions to a predefined finite set of positions. This issue provides a motivation toward decreasing the size of each of the teeth so as to decrease the incremental difference from one position to the next, providing for finer adjustments. Unfortunately, smaller teeth can result in decreased position assurance and loss of tactile sensations normally associated with the failure to securely seat the interlocking teeth. Other proposed solutions involve the use of frictions locks, which may provide more fine adjustments, but may sacrifice reliability, being susceptible to unintended releases (e.g., sliding adjustments, creep) under some loads.

Further, in a vehicle impact event, the steering column is configured to absorb energy of the impact to prevent or reduce injury to the operator due to collision with the steering wheel. In doing so, it is desired to further lock the rake position of the steering column to allow controlled energy absorption in such situations. In some steering column designs, during a collapse cycle, the column is designed to disengage the shaft and jacket assembly from the column mounting bracket. This allows the shaft and jacket assembly to shuttle forward in a vehicle, which allows the column to unclamp to facilitate internal collapse. At this point, rake lock needs to be maintained or re-established.

Accordingly, it is desirable to provide an energy absorbing rake lock assembly configured to establish rake lock during an impact event and to selectively fix and adjust a position of a steering column with improved fineness in the availability of adjustment positions and with improved reliability and security.

SUMMARY OF THE INVENTION

In one exemplary embodiment of the present invention, a position lock for a steering column assembly is provided. The position lock includes an outer cam. Also included is an inner cam defining a slotted aperture to receive a rake bolt operatively coupled to the outer cam, the slotted aperture facilitating shuttling movement of the rake bolt therein. Further included is a tooth lock operatively coupled to the inner cam, the tooth lock rotatable between an unlocked position and a locked position. Yet further included is a pin extending through the inner cam and operatively coupled to the outer cam, and rotation of the outer cam facilitates movement of the tooth lock out of engagement with the rake lock tooth wall when rotating between the locked position and the unlocked position.

In another exemplary embodiment of the present invention, a position lock for a steering column assembly is provided. The position lock includes an outer cam. Also included is an inner cam defining an aperture to receive a rake bolt operatively coupled to the outer cam, the aperture sized to correspond to an outer surface of the rake bolt. Further included is a tooth lock operatively coupled to the inner cam, the tooth lock rotatable between an unlocked position and a locked position. Yet further included is a pin extending through the inner cam and operatively coupled to the outer cam, the outer cam causing movement of the tooth lock out of engagement with the rake lock tooth wall when rotating between the locked position and the unlocked position. Also included is a lower jacket defining a slot to receive the rake bolt.

In yet another exemplary embodiment of the present invention, a steering column assembly is provided and includes a steering column. Also included is a rake lock bracket coupled to the steering column. Further included is a position lock. The position lock includes an outer cam. The position lock also includes an inner cam defining a slotted aperture to receive a rake bolt operatively coupled to the outer cam, the slotted aperture facilitating shuttling movement of the rake bolt therein. The position lock further includes a tooth lock operatively coupled to the inner cam, the tooth lock rotatable between an unlocked position and a locked position. The position lock yet further includes a pin extending through the inner cam and operatively coupled to the outer cam, and rotation of the outer cam causing movement of the tooth lock out of engagement with the rake lock tooth wall when rotating between the locked position and the unlocked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

During typical usage, an eccentric cam is unlocked via feature(s) on a rake lever and or feature(s) on the rake bolt, to allow for rake adjustment of a steering column. Once the desired rake position of the steering column is achieved, the steering column may be relocked via the rake lever. If the lever is in the locked position, the eccentric cam rests against a column mounting tooth configuration, therefore maintaining a constant locked condition.

During a collapse cycle event, the eccentric tooth maintains its locked position while allowing the rake lever and bolt, as well as the jacket assembly to shuttle forward, therefore releasing column clamp pressure. This described shuttling event is facilitated by means of a cylindrical boss feature on the eccentric mounting plate to which the eccentric cam pivots. The boss has a slot at or near center, of which, allows the rake bolt to pass through and allows for shuttling of the rake bolt during the collapse event. These components may also be configured so the boss resides on the eccentric cam, with a slot at or near center of the boss, and the mating plate would have a round hole in which the eccentric cam boss will mate. As a result, the eccentric toothed cam is configured to wind up and create binding/locking in the rake direction. In addition, reaction feature(s) may be added to existing component(s) and or additional component(s) to further provide added binding/locking.

Figure 1A:
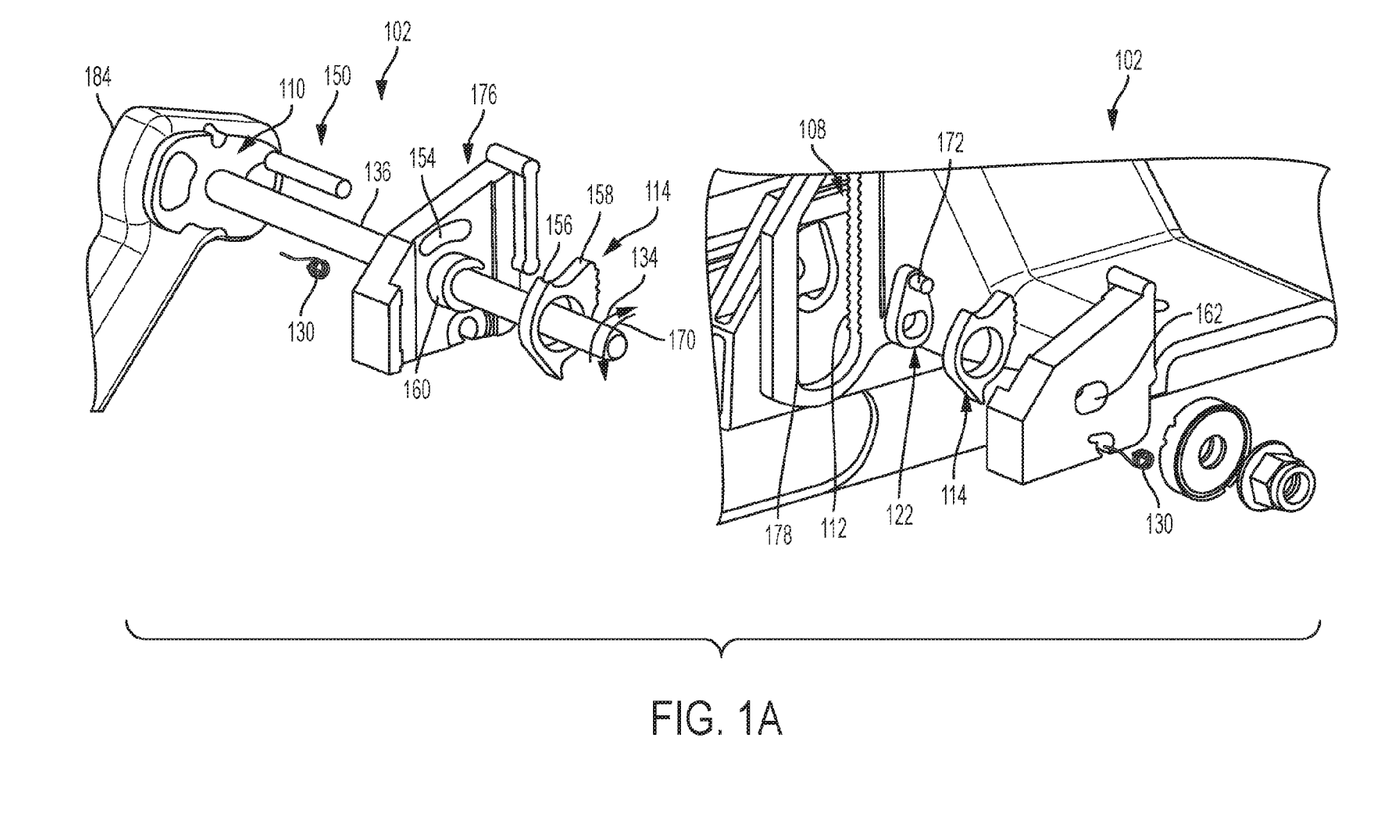
FIG. 1A illustrates a steering column assembly according to an embodiment of the disclosure.
Figure 1B:
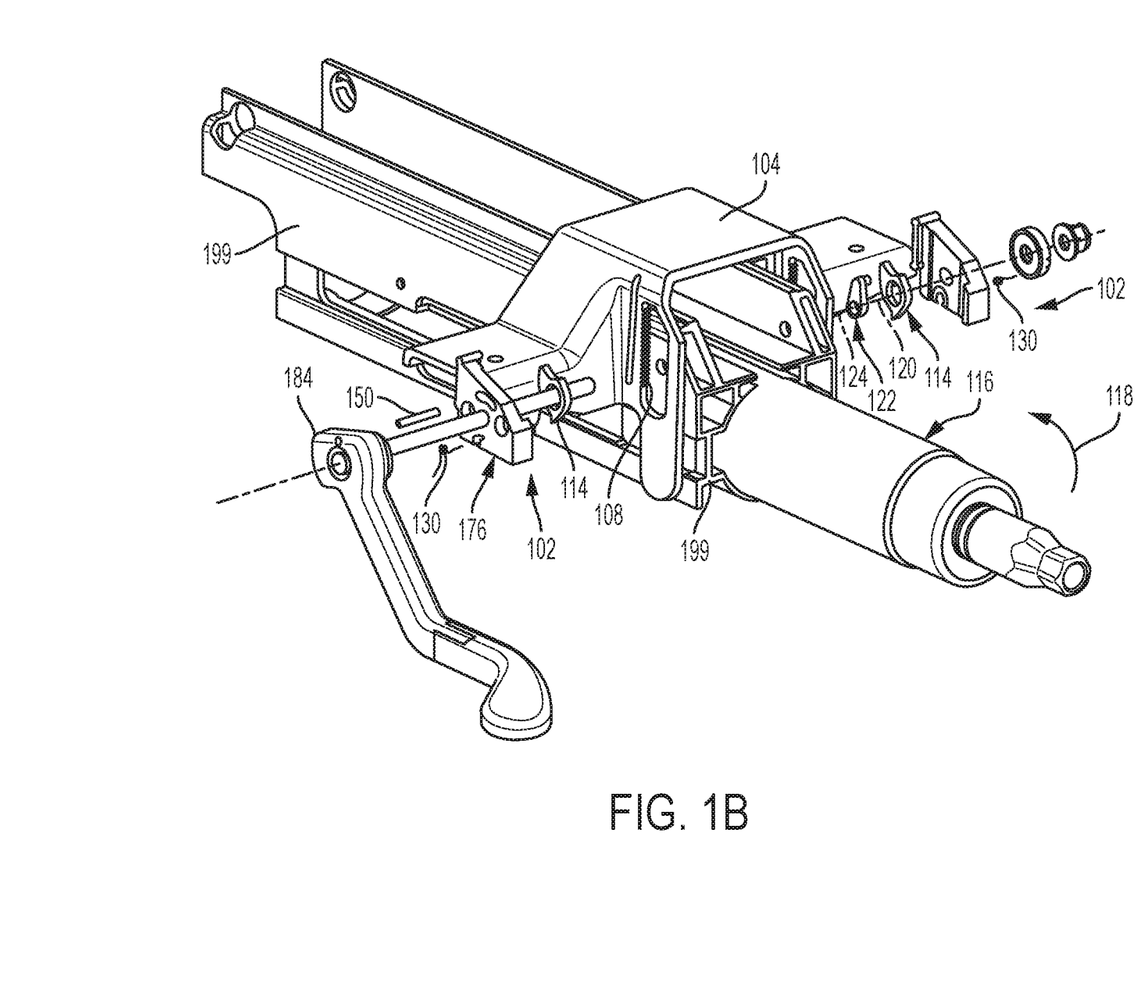
FIG. 1B illustrates another aspect of the steering column assembly of FIG. 1A.
Figure 2:
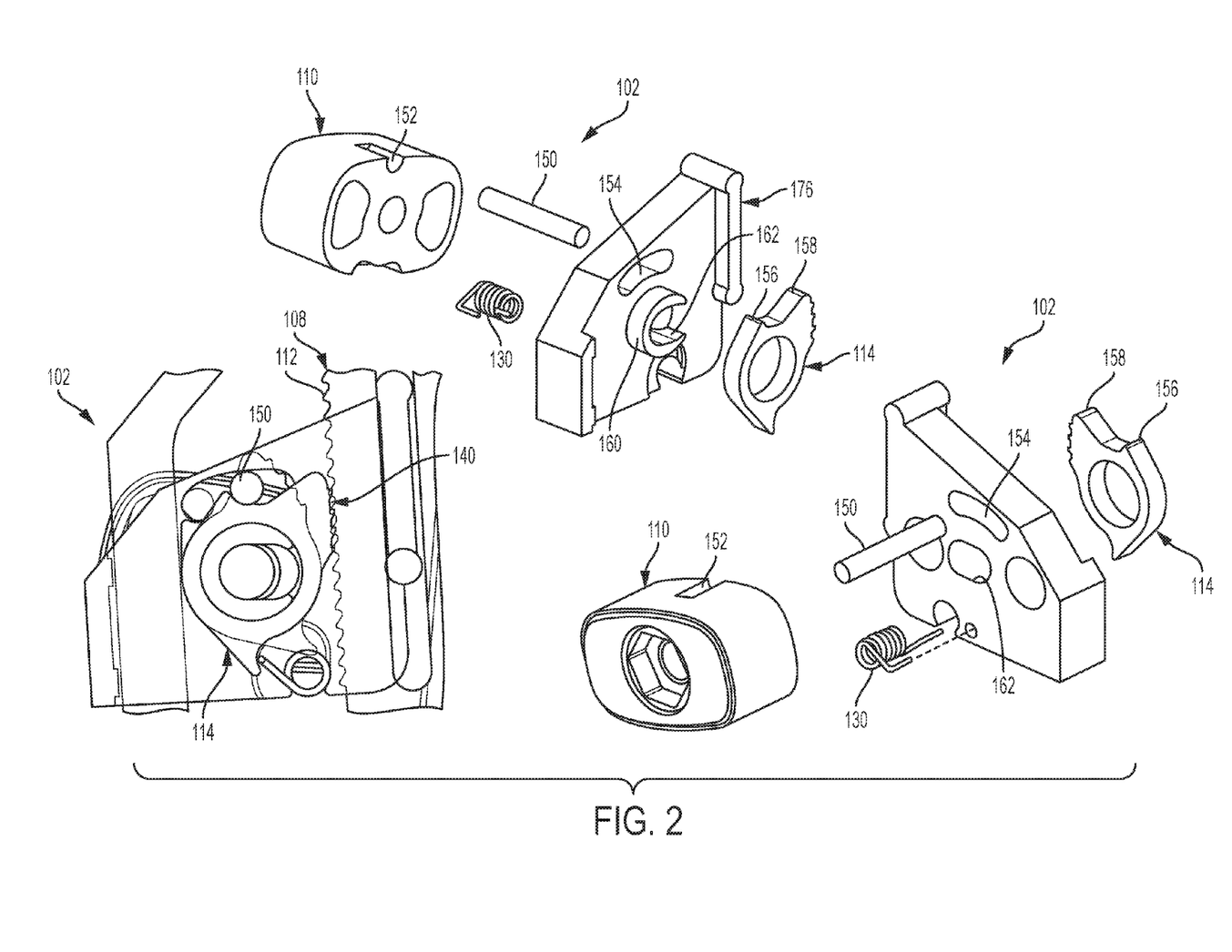
FIG. 2 illustrates another aspect of the steering column assembly of FIGS. 1A and 1B.

Referring now to the Figures, where the invention will be described with reference to specific embodiments, without limiting same, FIGS. 1A, 1B and 2 illustrate an exemplary steering column assembly 100. As shown in FIGS. 1A and 1B, an exemplary steering column assembly 100 of a vehicle (not shown) comprises a steering column lock arm 184 for selectively resisting or facilitating raking movement of a steering column 116 within an adjustment range defined by a position lock 102. When the steering column lock arm 184 is positioned so as to place the position lock 102 in a locking mode, the steering column 116 is inhibited from being adjusted. Accordingly, the steering column 116 is relatively fixed, positionally, with respect to the vehicle. When the steering column lock arm 184 is positioned so as to place the position lock 102 in an adjustment mode, adjustments to the positioning of the steering column 116 are facilitated. Accordingly, the steering column 116 is relatively may be positionally adjusted relative to the vehicle. Once the steering column 116 occupies a desirable position, the steering column lock arm 184 may be re-positioned so as to return the position lock 102 to the locking mode.

Position lock 102 is configured for selectively resisting or facilitating raking adjustment of a steering column 116 of a vehicle and includes a rake lock bracket 104. In an exemplary embodiment, the rake lock bracket 104 is fixed to a structure of the vehicle (not shown) and disposed adjacent to the steering column 116, along a raking direction 118 of the steering column 116. As shown in FIGS. 1 and 2, an exemplary rake lock bracket 104 has a rake lock tooth wall 108 that bounds a control slot 178 (FIG. 1A) and that defines a plurality of rake lock teeth 112. The rake lock tooth wall 108 with its plurality of rake lock teeth 112 provides a stationary structure against which a cooperating member (e.g., a locking tooth 114) may be engaged so as to lock the cooperating member to the stationary structure. It should be appreciated that locking surface features other than teeth (e.g., a rough or tacky surface) may be employed so as to provide a stationary structure against which a cooperating member may be engaged so as to lock the cooperating member to the stationary structure.

A tooth lock 114 is supported for rotation about a tooth lock rotation axis 120, and a driver 122 is supported for rotation about a driver rotation axis 124. In an exemplary embodiment, both the tooth lock rotation axis 120 and the driver rotation axis 124 correspond to the longitudinal axis of a rake lock control shaft or bolt 136, which is coupled to the steering column lock arm 184. The steering column lock arm 184 is coupled to the rake lock control shaft 136 such that steering column lock arm 184 facilitates application of a torque upon the rake lock control shaft 136 in either a locking direction 134 or an adjustment direction 170 (see FIG. 1A).

In an exemplary embodiment, an outer cam 110 operates in conjunction with the steering column lock arm 184 so as to limit the absolute range of rotation of the rake lock control shaft 136 so as to prevent application of excessive loads upon the tooth lock 114 or other components of the position lock 102.

An inner cam 176 may be used in connection with the outer cam 110 to limit the absolute range of rotation of the rake lock control shaft 136. For example, a pin 150 may be pressed into a slot 152 formed in outer cam 110, and pin 150 may then extend through a slot 154 formed in inner cam 176 to interact with tooth lock 114. As illustrated, as lock arm 184 rotates in the adjustment direction, pin 150 engages a first tooth lock projection 156 to rotate tooth lock 114 away from engagement with tooth wall 108. Similarly, as lock arm 184 rotates in the locking direction 134, pin 150 is engageable with a second tooth lock projection 158 to rotate tooth lock 114 into engagement with tooth wall 108. Alternatively, or in combination with engagement of the pin 150 and second tooth lock projection 158, the pin may allow a spring load to rotate with the tooth lock 114. Driver 122 may interact with the tooth lock projections 156, 158 in a similar manner.

In addition, the inner cam 176 may be used along with the rake lock bracket 104 to define the range of translational motion of the rake lock control shaft 136 as well as that of the tooth lock 114 and the driver 122. A spring 130 is arranged so as to aid in control of the tooth lock 114. The tooth lock 114 is configured for selectively engaging and disengaging from the rake lock tooth wall 108 and the plurality of rake lock teeth 112, in response to rotation of the rake lock control shaft 136, so as to selectively resist or facilitate translation of the tooth lock 114 in the raking direction 118.

In an exemplary embodiment, the rake lock control shaft 136 is translationally fixed to both the steering column 116 and the tooth lock 114 such that when the steering column 116 undergoes raking movement, the rake lock control shaft 136 and the tooth lock 114 also undergo raking movement. Accordingly, when the tooth lock 114 is prevented from undergoing raking movement, the rake lock control shaft 136 and the steering column 116 are also prevented from undergoing raking movement. In an exemplary embodiment, the tooth lock 114 is coupled to the steering column 116 for movement with the steering column 116 in a raking direction 118, and, as shown in FIG. 1B, the driver 122 is supported for translation with the tooth lock 114.

FIG. 2 illustrates portions of an exemplary position lock 102 in both a locked mode and unlocked mode. As shown in FIG. 2, the tooth lock 114 is configured for engaging, upon rotation in the locking direction 134, at least one tooth of the plurality of rake lock teeth 112 so as to selectively resist translation of the tooth lock 114 and the steering column 116 in the raking direction 118.

FIG. 2 illustrates portions of an exemplary position lock 102 in the unlocked mode or adjustment mode. As shown in FIG. 2, the tooth lock 114 is configured for disengaging, upon rotation in an adjustment direction 170, from the at least one tooth of the plurality of rake lock teeth 112 so as to selectively facilitate translation of the tooth lock 114 and the steering column 116 in the raking direction 118. In addition, a driver control arm 172 of driver 122 contacts first projection 156 on tooth lock 114, thereby causing a toothed peripheral edge 140 on tooth lock 114 to disengage from the plurality of rake lock teeth 112 on rake lock bracket 104.

In the exemplary embodiment, the inner cam 176 includes a cylindrical boss 160 and a slotted bolt opening 162 to facilitate forward translation of rake bolt 136 therein. Tooth lock 114 is positioned over and rotates about the cylindrical boss 160 such that tooth lock 114 may engage tooth wall 108 and maintain engagement therewith as rake bolt 136 shuttles or translates forward in slotted bolt opening 162. For example, during a crash event, lever 184, bolt 136, outer cam 110, and pin 150 move forward in the direction of arrow 164 (FIG. 1B), which allows shuttling thereof and release of the column clamping device 104 to release so an energy absorption mechanism (e.g., a roll strap) may take effect. As such, slotted opening 162 enables rake bolt 136 to shuttle without interrupting the engagement between tooth lock 114 and tooth wall 108.

The clamping device 104 surfaces that engage the steering column 116 may be angled along the clamp path. Such angling may be employed to facilitate the start of collapse, provide clamp pressure relief, and/or cushion impact loads at a travel stop. It is to be appreciated that all or fewer of the clamp surfaces may be angled.

Figure 3:
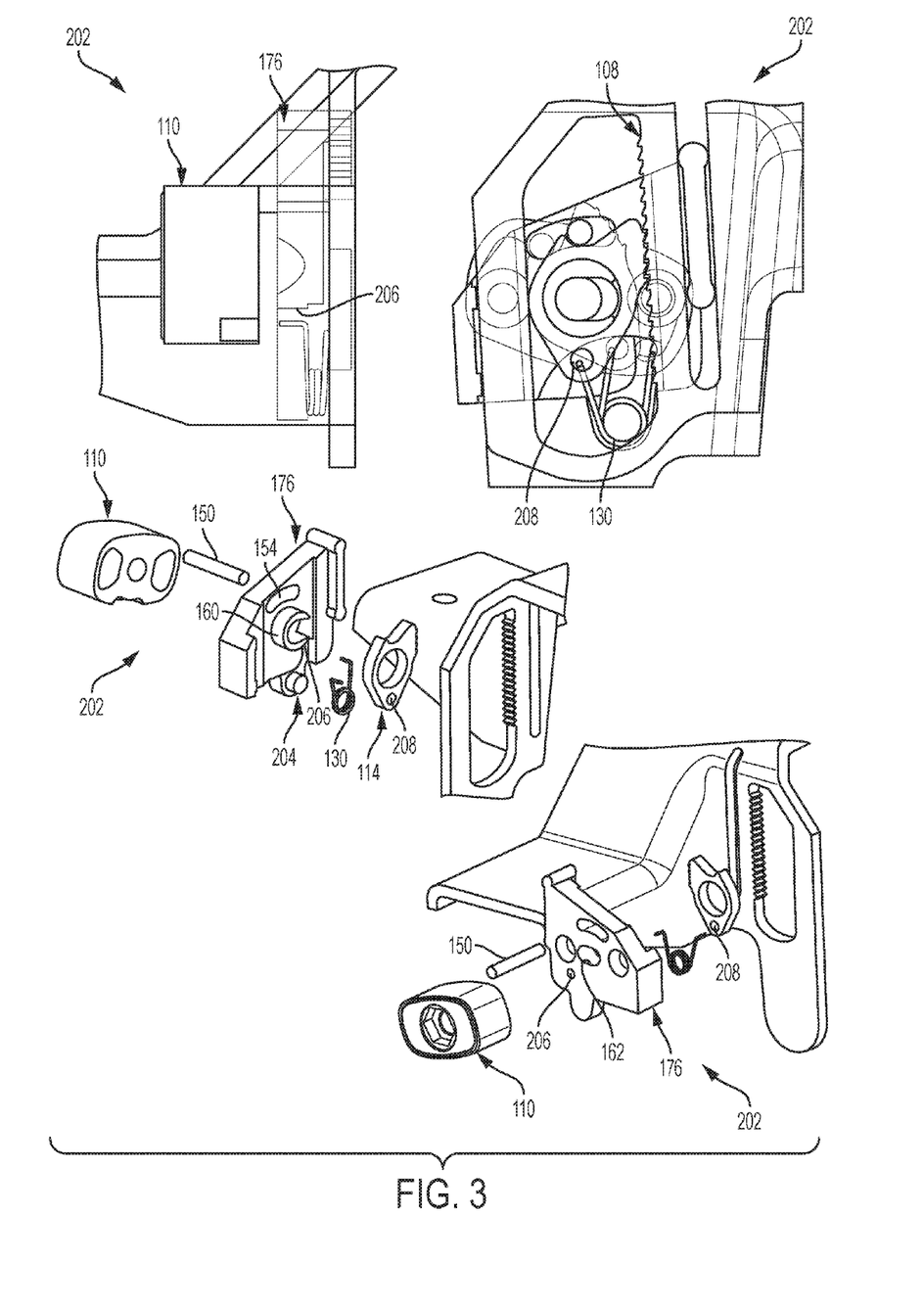
FIG. 3 illustrates an alternative embodiment of the steering column assembly shown in FIGS. 1A-2.

FIG. 3 illustrates an alternate position lock 202 that is similar to the position lock 102 except inner cam 176 includes a post 204 to receive the spring 130. In addition, the inner cam 176 and tooth lock 114 include respective apertures 206 and 208 to receive a portion of the spring 130, as shown in FIG. 3.

Figure 4A:
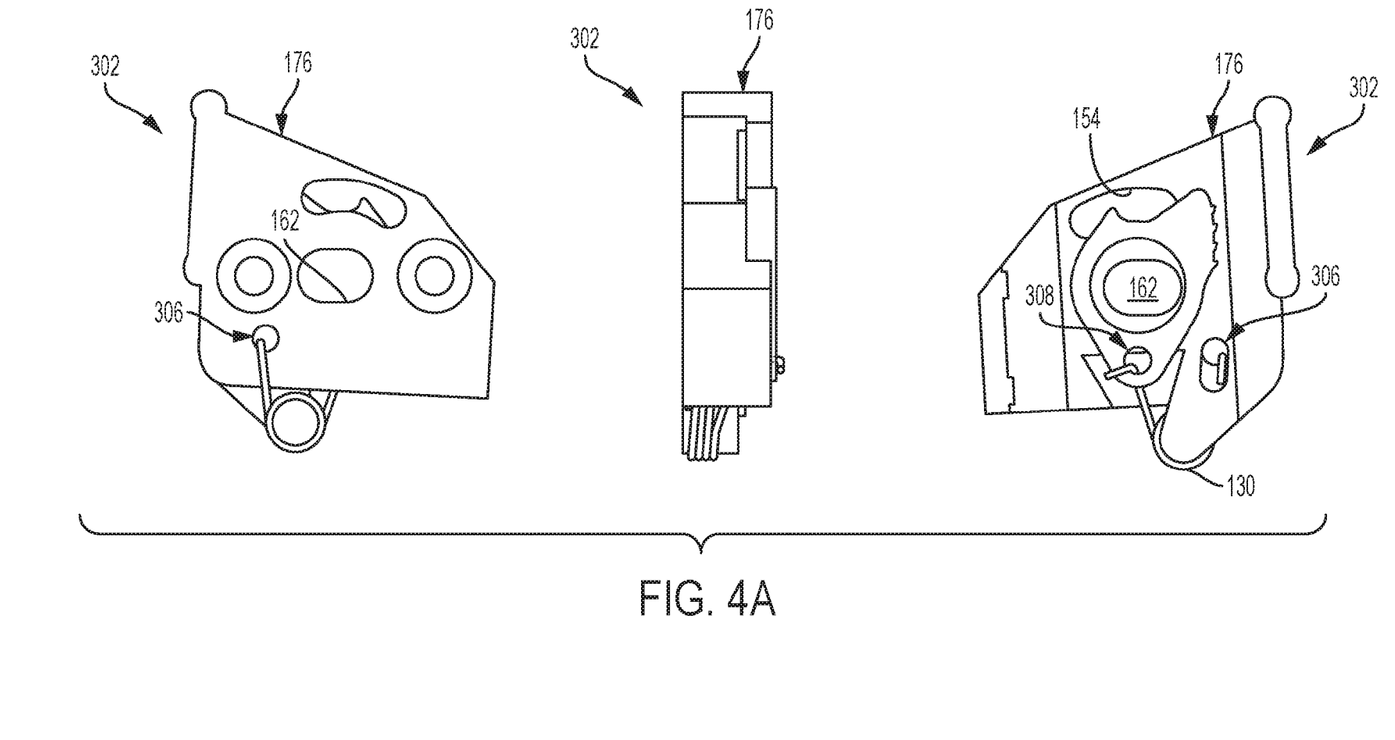
FIG. 4A illustrates another alternative embodiment of the steering column assembly shown in FIGS. 1A-2.
Figure 4B:
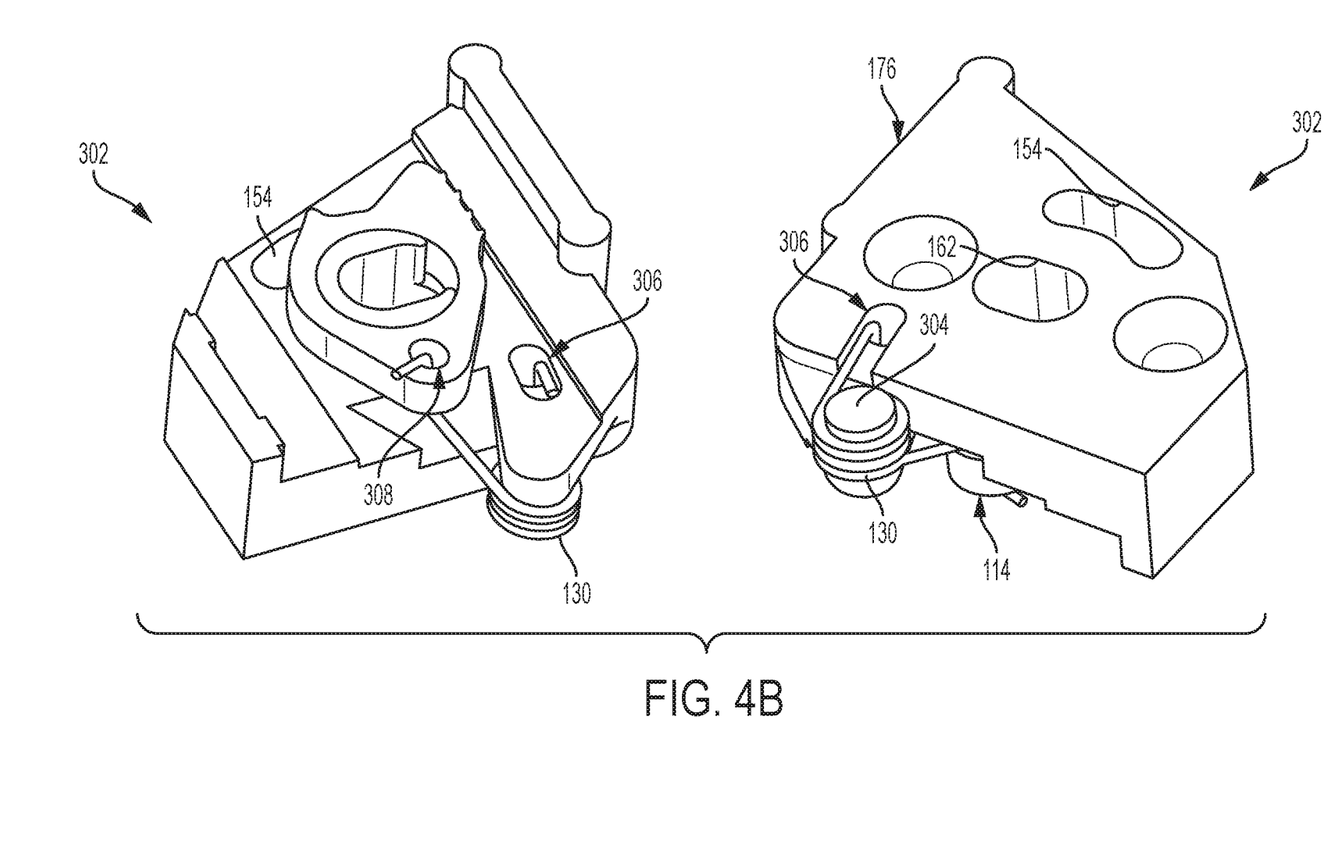
FIG. 4B illustrates another aspect of the embodiment of FIG. 4A.

FIG. 4 illustrates an alternate position lock 302 that is similar to the position lock 102 except inner cam 176 includes a post 304 to receive the spring 130. In addition, the inner cam 176 and tooth lock 114 include respective apertures 306 and 308 to receive a portion of the spring 130, as shown in FIGS. 4A and 4B.

Figure 5:
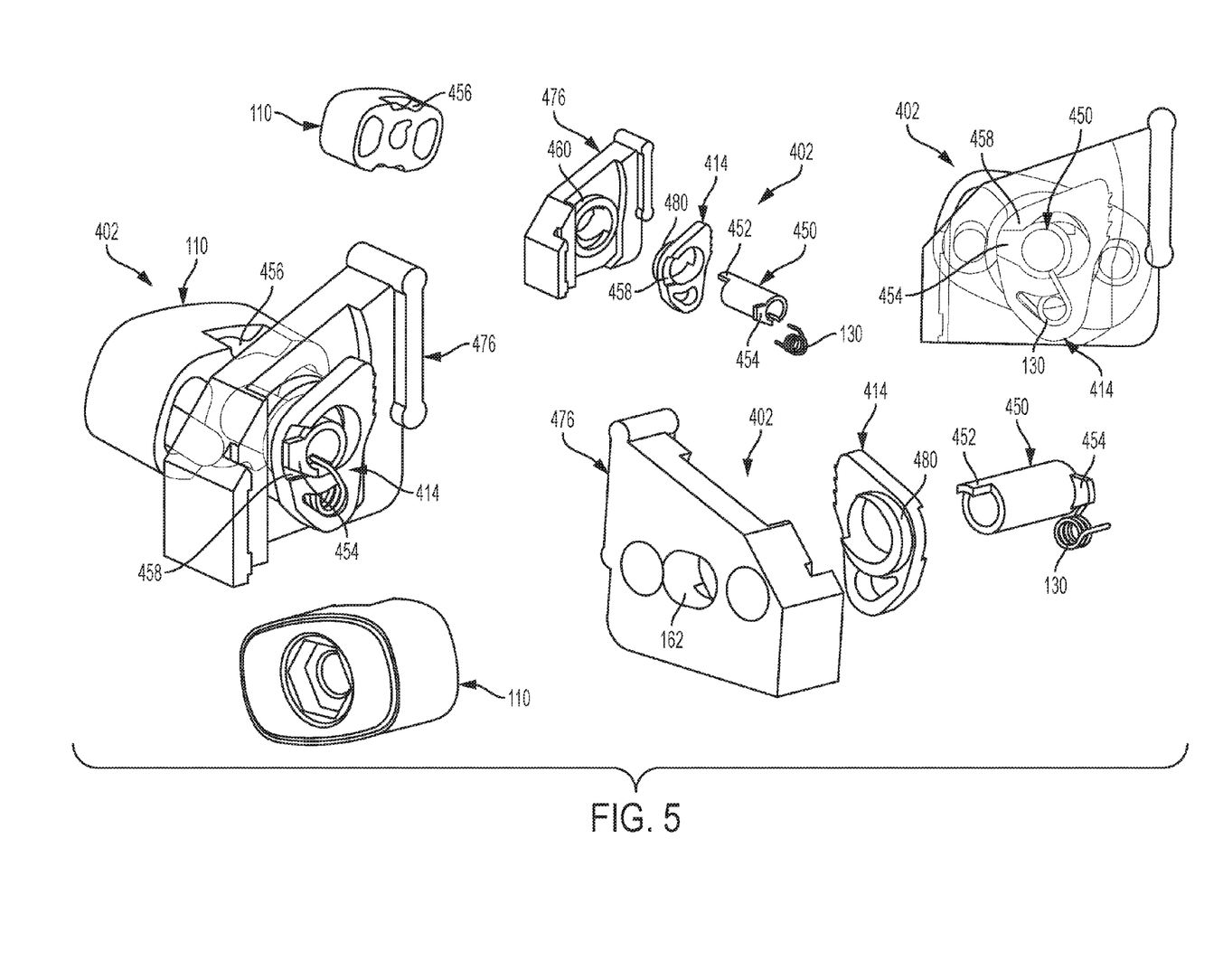
FIG. 5 illustrates yet another alternative embodiment of the steering column assembly shown in FIGS. 1 and 2.

FIG. 5 illustrates an alternate position lock 402 that is similar to the position lock 102 except it includes an inner cam 476, a tooth lock 414, and a pin 450. Inner cam 476 includes a cylindrical boss 460 that receives a flange 480 of tooth lock 414 to facilitate rotation of tooth lock 414 therein. Pin 450 includes a first projection 452 and a second projection 454. First projection 452 is positioned within a slot 456 formed in outer cam 110, and second projection 454 is positioned within a slot 458 formed in tooth lock 414. As such, rotation of outer cam 110 engages first projection 452, which rotates pin 450 and causes rotation of tooth lock 414 into and out of engagement with tooth wall 108.

Figure 6:
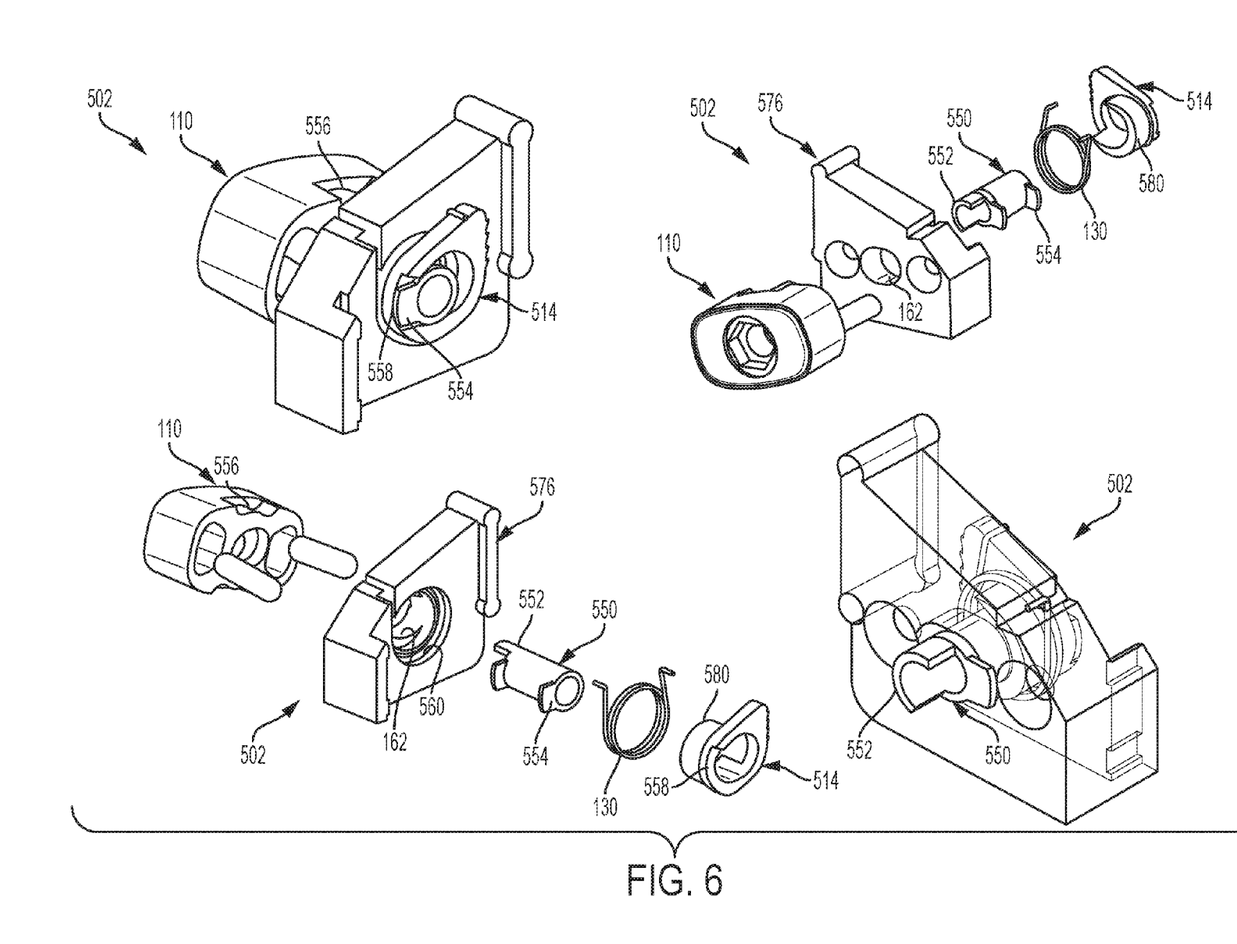
FIG. 6 illustrates yet another alternative embodiment of the steering column assembly shown in FIGS. 1 and 2.

FIG. 6 illustrates an alternate position lock 502 that is similar to the position lock 102 except it includes an inner cam 576, a tooth lock 514, and a pin 550. Inner cam 576 includes a cylindrical bore 560 that receives the spring 130 and a flange 580 of tooth lock 514 to facilitate rotation of tooth lock 514 therein. Pin 550 includes a first projection 552 and a second projection 554. First projection 552 is positioned within a slot 556 formed in outer cam 110, and second projection 554 is positioned within a slot 558 formed in tooth lock 514. As such, rotation of outer cam 110 engages first projection 552, which rotates pin 550 and causes rotation of tooth lock 514 into and out of engagement with tooth wall 108.

Figure 7:
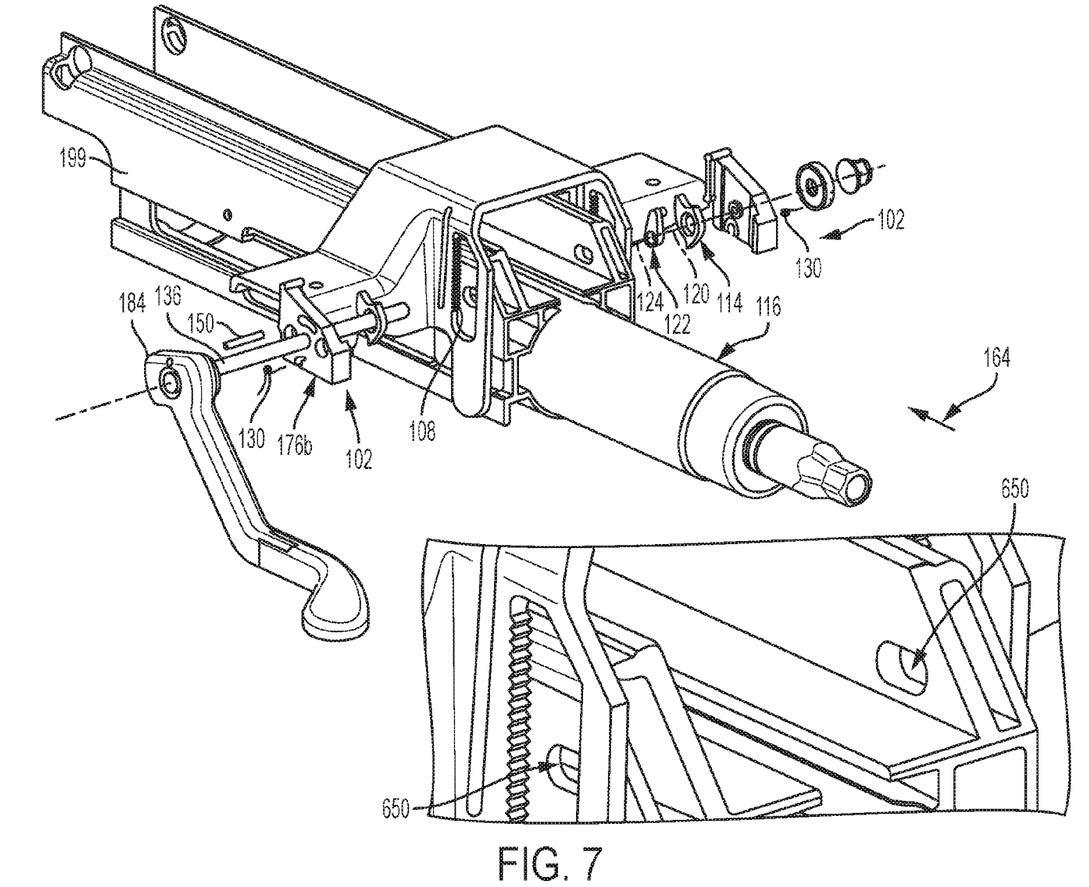
FIG. 7 illustrates yet another alternative embodiment of the steering column assembly shown in FIGS. 1 and 2.

FIG. 7 illustrates an alternate position lock 602 that is similar to the position lock 102 and similar reference numerals are employed for corresponding elements. The inner cam 176 of position lock 602 includes a slot bolt opening 662 that is not slotted as is the case with position lock 102. Rather, the slot bolt opening 662 is dimensioned to correspond to the outer dimension of rake bolt 136. Such dimensioning results in a tight, fitted relationship between the inner cam 176 and the rake bolt 136. Rather than having the rake bolt 136 move forward relative to the jacket during shuttling of the jacket, the rake bolt does not move forward relative to the jacket. In the illustrated embodiment, the rake bolt moves with the jacket due to at least one slot 650 defined by the lower jacket, the rake bolt 136 extending through the slot(s) 650. This assembly allows forward motion of the lower jacket during an energy absorption event, without requiring the rake bolt 136 to move forward. In this embodiment, the rake bolt 136 remains stationary in the fore-aft direction and is fully piloted by the inner cam 176.

The systems and methods described herein may function within small package environments with a limited number of engaged teeth. Further, design options also exist with a stationary bolt axis among other moving components to engage (e.g., lower jacket 199).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A position lock for a steering column assembly, the position lock comprising:
   an outer cam;

an inner cam defining a slotted aperture to receive a rake bolt operatively coupled to the outer cam, the slotted aperture facilitating shuttling movement of the rake bolt therein;

a tooth lock operatively coupled to the inner cam, the tooth lock rotatable between an unlocked position and a locked position; and a pin extending through the inner cam and operatively coupled to the outer cam, and rotation of the outer cam facilitates movement of the tooth lock out of engagement with the rake lock tooth wall when rotating between the locked position and the unlocked position.

2. The position lock of claim 1, wherein the inner cam defines an arcuate slot through which the pin extends, the pin slidable along the arcuate slot.

3. The position lock of claim 1, wherein the inner cam includes a cylindrical boss extending from an inner side of the inner cam, the cylindrical boss having an opening corresponding to the slotted aperture of the inner cam to facilitate shuttling movement of the rake bolt.

4. The position lock of claim 3, wherein the tooth lock defines an inner aperture dimensioned to fit over the outer perimeter of the cylindrical boss and rotate about the cylindrical boss.

5. The position lock of claim 1, further comprising a spring operatively coupled to the inner cam and engaged with the tooth lock to bias the tooth lock toward the locked position.

6. The position lock of claim 5, wherein the spring is operatively coupled to the inner cam upon extension through an inner cam spring receiving aperture and to the tooth lock upon extension through a tooth lock spring receiving aperture.

7. The position lock of claim 1, wherein the outer cam comprises a recess dimensioned to receive the pin therein.

8. The position lock of claim 1, wherein the inner cam includes a cylindrical boss extending from an inner side of the inner cam, the tooth lock comprising a flange extending therefrom and dimensioned to fit within an inner perimeter of the cylindrical boss and rotate therein.

9. The position lock of claim 8, wherein the pin comprises a first projection engaged with a recess wall of the outer cam, the pin comprising a second projection engaged with a slot defined by the tooth lock.

10. The position lock of claim 1, wherein the inner cam includes a cylindrical bore defined by an inner side of the inner cam, the tooth lock comprising a flange extending therefrom and dimensioned to fit within the cylindrical bore and rotate therein.

11. A position lock for a steering column assembly, the position lock comprising:
an outer cam;
an inner cam defining an aperture to receive a rake bolt operatively coupled to the outer cam, the aperture sized to correspond to an outer surface of the rake bolt;
a tooth lock operatively coupled to the inner cam, the tooth lock rotatable between an unlocked position and a locked position;
a pin extending through the inner cam and operatively coupled to the outer cam, the outer cam causing movement of the tooth lock out of engagement with the rake lock tooth wall when rotating between the locked position and the unlocked position; and
a lower jacket defining a slot to receive the rake bolt.

12. The position lock of claim 11, wherein the inner cam defines an arcuate slot through which the pin extends, the pin slidable along the arcuate slot, the aperture of the inner cam facilitating shuttling movement of the rake bolt therein.

13. The position lock of claim 11, further comprising a spring operatively coupled to the inner cam and engaged with the tooth lock to bias the tooth lock toward the locked position.

14. The position lock of claim 11, wherein the outer cam comprises a recess dimensioned to receive the pin therein.

15. A steering column assembly comprising:
a steering column;
a rake lock bracket coupled to the steering column; and
a position lock comprising:
an outer cam;
an inner cam defining a slotted aperture to receive a rake bolt operatively coupled to the outer cam, the slotted aperture facilitating shuttling movement of the rake bolt therein;
a tooth lock operatively coupled to the inner cam, the tooth lock rotatable between an unlocked position and a locked position; and
a pin extending through the inner cam and operatively coupled to the outer cam, and rotation of the outer cam causing movement of the tooth lock out of engagement with the rake lock tooth wall when rotating between the locked position and the unlocked position.

* * * * *